Nov. 13, 1945. W. A. FENNELL 2,389,036
MEANS FOR SEALING ROTARY PLUG TYPE VALVES
Filed March 23, 1943
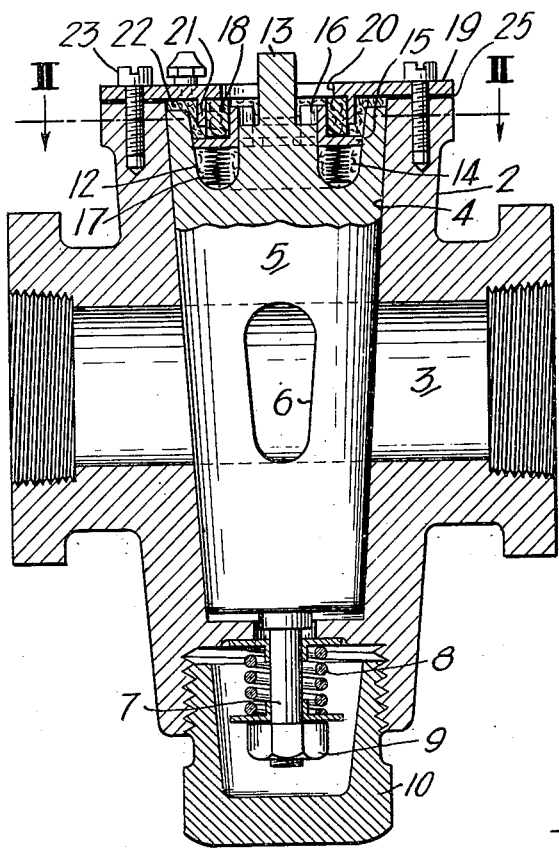
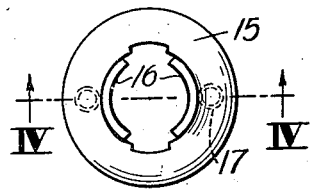
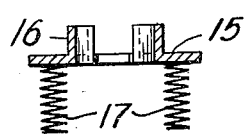
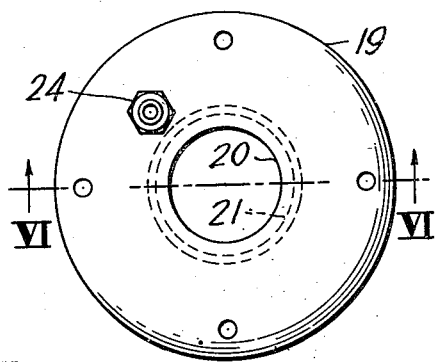
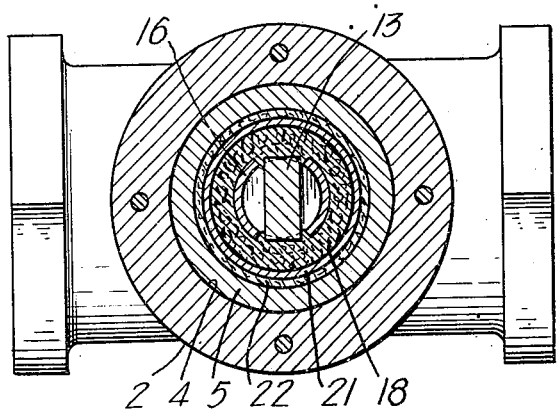
INVENTOR:
WILLIAM A. FENNELL,
BY John E. Jackson
ATTORNEY Patented Nov. 13, 1945

2,389,036

UNITED STATES PATENT OFFICE 2,389,036

MEANS FOR SEALING ROTARY PLUG TYPE VALVES

William A. Fennell, Clairton, Pa.

Application March 23, 1943, Serial No. 480,209

2 Claims. (Cl. 286—9)

This invention relates to valves and, particularly to an improved means for sealing rotary plug type valves so as to prevent leakage thereof.

It is customary to use valves of the rotary plug type in gas lines for controlling the flow of the gases therethrough. Such a valve consists generally of a valve body having rotatable plug arranged in a tapered hole therein for opening and closing the valve. There is arranged transversely of the plug, a hole through which the fluid or gases pass when the valve is moved to its open position and the plug is turned 90 degrees to the hole to close the same, in a well known manner. One end of the plug usually projects outwardly from the valve body and there is arranged on that end of the plug suitable means, such as a square or rectangular-shaped head or other manipulating portion, for rotating the plug to open and close the valve.

Various means have been suggested and used for sealing the space between the outer end of the plug at the manipulating end and the valve body so as to prevent leakage of the fluid or gases therebetween. While some of the suggested sealing means are in some respects satisfactory, others are not effective, in that, after the valves were in service for a short time, particularly if they were subjected to severe service, the plugs would become worn and loosen in the tapered hole so that the fluid or gases would escape from the valve around the plug. Usually the only means provided for sealing the end of the plug was a layer of grease disposed at the end of the plug but such a seal was not effective to prevent the fluid or gases from escaping around the worn plug. Such leakage of the fluid or gases was not only expensive but was a hazard to workmen in the vicinity thereof, in that oftentimes they were overcome by the gases or were burned seriously if the gases were accidentally ignited. It is to an improved means for sealing the manipulating end of such valves that this present invention relates.

Accordingly, it is the general object of the present invention to provide an improved means for sealing the end of valves of the rotary plug type which effectively prevents leakage of the fluid or gases from between the valve body and the plug thereby eliminating any of the above mentioned disadvantages and hazards.

It is another object of this invention to provide an improved means for sealing the end of valves of the rotary plug type which is simple and inexpensive, and at the same time, reduces the maintenance of the valve and replacement of parts therein to a minimum.

Various other objects and advantages of this invention will be more apparent in the course of the following specification and will be particularly pointed out in the appended claims.

In the accompanying drawing there is shown, for the purpose of illustration, an embodiment which my invention may assume in practice.

In the drawing:

Figure 1 is a longitudinal section of a rotary plug type valve showing the improved sealing means of my invention incorporated therewith;

Figure 2 is a sectional view taken on line II—II of Figure 1;

Figure 3 is a detail view of the annular or gland member of my improved sealing means;

Figure 4 is a sectional view taken on line IV—IV of Figure 3;

Figure 5 is a detail view of the cap member; and

Figure 6 is a sectional view taken on line VI—VI of Figure 5.

Referring more particularly to the drawing, there is shown a conventional rotary plug type valve consisting of a body member 2 having a passageway 3 arranged therethrough through which the fluid or gases are adapted to pass. There is arranged in the valve body substantially perpendicular to the passageway 3, a tapered hole 4 in which there is positioned a tapered plug 5, having a hole 6 arranged therethrough through which the fluid or gases are adapted to pass in a well known manner, when the valve is disposed in its open position.

In the inner or smaller end of the plug 5, there is arranged axially thereof, preferably a stud 7 around which there is disposed a coil spring 8 which is positioned between the body member 2 and a nut 9 arranged on the outer threaded end portion of the stud 7. It is the purpose of the stud 7 together with the spring 8 to maintain the plug 5 yieldably in position in the tapered hole 4 of the valve body. There is provided preferably a cap or plug 10 which is screwed in the end of the body member for housing the stud 7, together with the nut 9 and the coil spring 8.

According to the present invention, there is arranged in the outer or larger end of the plug 5 concentric therewith, an annular groove 12 which is disposed around, preferably a rectangular-shaped manipulating portion 13 arranged on that end of the plug which extends outwardly from the body member 2. There is disposed in the bottom of the groove 12, a high temperature plastic sealing medium 14 which consists preferably of a fibrous grease. Directly next to the sealing medium or fibrous grease 14, there is positioned an annular gland member 15 having an outwardly extending flange portion 16 carried thereby which is disposed directly next to the manipulating or center portion of the plug 5 on the inner side of the groove 12. There is also carried by the annular member 15 preferably a pair of coil springs 17 which extend inwardly therefrom and which are preferably welded thereto. These springs are positioned in the sealing medium 14 with the inner ends of the springs positioned on the bottom of the groove 12. On top of the annular member 15, there is positioned an annular packing member 18 with the inner periphery thereof positioned directly next to the outer side of the flange portion 16 of the annular member 15.

On the outer side of the body member 2, there is arranged a cap member 19 having a cylindrical opening 20 arranged centrally therethrough through which the manipulating portion 13 of the plug 5 extends. There is carried by the cap member 19, an inwardly extending flange portion 21 with the inner side thereof disposed directly next to the outer periphery of the annular packing member 18 opposite from the flange portion 16 of the gland 15. Between the cap 19 and the outer end of the plug 5, there is disposed preferably a layer of heavy grease 22. The cap member 19 and a gasket 25 are held in engagement with the valve body 2, preferably by means of a plurality of cap screws 23 and there is carried by the cap member 19 preferably a grease connection or fitting 24, whereby the grease 22 may be supplied to the space between the end of the plug and the cap member.

The improved sealing means of my invention is assembled in position and functions in the following manner. It will be assumed that the plug 5 is already positioned in the tapered hole 4 of the valve body 2. The layer of plastic sealing medium or fibrous grease 14 is then positioned in the annular groove 12 so as to be evenly distributed therearound. The annular gland member 15 is then positioned in the groove 12 around the manipulating portion 13 so as to compress the sealing medium 14 and so that the pair of coil springs 17 carried thereby, is embedded therein with the inner ends of the springs resting against the bottom of the groove and compressed about ¾ of an inch. The flange portion 16 of the member 15 extends outwardly along the manipulating or center portion of the plug 5. The annular packing member 18 is then positioned in the groove on top of the annular member 15 and arranged so that the inner periphery thereof lies directly next to the flange portion 16 of the annular member. The annular packing member 18 is, preferably, thoroughly lubricated before it is positioned on the annular member 15. The layer of heavy grease 22 is then disposed over the end of the plug 5 and around the outer side of the groove 12, and the cap member 19 and gasket 25 are then placed on the end of the body member and around the manipulating portion 13 of the plug 5. The cap screws 23 are then inserted in position and drawn tight thereby forcing the layer of grease 22 around the end of the plug and down into the space between the outer side of the flange 21 of the cap member 19 and the outer side of the groove 12.

It is the purpose of the grease fitting 24 to replenish the supply of grease 22 between the cap 19 and the plug 5 as often as is necessary without removing the cap. It will be understood that it is the purpose of the coil springs 17 to force the annular member 15 outwardly against the packing member 18 so as to tend to compress the same between the outer surface of the annular member 15 and the inner surface of the cap member 19.

It will be understood that the plug 5 is turned by means of the rectangular-shaped manipulating portion 13 carried thereby and that the valve is moved to its closed position by rotating the plug through 90 degrees in a well known manner. When the plug 5 is turned, either to its open or closed position, the plastic sealing medium or fibrous grease 14, the annular gland member 15 and the annular packing member 18, rotate therewith while the cap member 19 remains stationary. By providing such a construction, it will be seen that the only part which is subject to wear, is the annular packing member 18. When this gasket or packing member wears down to such a degree that the grease 22 begins to leak out around the manipulating portion 13, the cap 19 together with the other parts is removed and the end of the plug 5 is again repacked as described. It has been found, however, that the sealing means of the present invention, will give a great amount of service before it need be replaced.

It will be understood that my improved sealing means may be incorporated with all types of plug valves, either screwed or flanged with a tapered or straight plug, and with either an oblong, square, hexagon, or other shaped manipulating portions.

While I have shown and described one specific embodiment of my invention, it will be understood that this embodiment is merely for the purpose of illustration and description and that various other forms may be devised within the scope of my invention, as defined in the appended claims.

I claim:

1. In a valve of the rotary plug type, a cap member formed with a flange portion on the inner side thereof and a shaft formed with a shoulder to provide an annular surface under the cap member and provided with an annular groove in the shoulder, means for sealing the outer end of the shaft comprising an annular member disposed in the groove having a flange portion which extends outwardly toward the cap member, said flange portion disposed substantially parallel to and spaced from the flange on the cap member, and an annular packing member arranged between said annular member and the cap member and the flange on said cap member.

2. In a valve of the rotary plug type, a cap member formed with a flange portion on the inner side thereof and a shaft formed with a shoulder to provide an annular surface under the cap member and provided with an annular groove in the shoulder, means for sealing the outer end of the shaft comprising an annular member disposed in the groove having a flange portion which extends outwardly toward the cap member, said flange portion disposed substantially parallel to and spaced from the flange on the cap member, an annular packing member arranged between said annular member and the cap member and the flange on said cap member, and spring means arranged in the bottom of the annular groove below the annular member disposed therein whereby the annular member together with the packing member is forced outwardly thereby against the inside of the cap member.

WILLIAM A. FENNELL.